United States Patent [19]

Lane et al.

[11] 3,998,769

[45] Dec. 21, 1976

[54] MICA, FREE, CRACK-RESISTANT DRYING TYPE JOINT COMPOUND

[75] Inventors: Marvin K. Lane, Chicago; Winton C. Anderson, Elk Groove Village, both of Ill.

[73] Assignee: United States Gypsum Company, Chicago, Ill.

[22] Filed: Dec. 24, 1975

[21] Appl. No.: 644,213

Related U.S. Application Data

[63] Continuation of Ser. No. 277,446, Aug. 2, 1972, abandoned.

[52] U.S. Cl. .................. 260/17.4 ST; 260/29.6 R; 260/29.6 PS
[51] Int. Cl.² ............................................. C08L 3/02
[58] Field of Search ............... 260/17.4 ST, 29.6 R, 260/29.6 PS

[56] References Cited

UNITED STATES PATENTS

| 3,003,979 | 10/1961 | Ptasienski et al. | 260/17 |
| 3,297,601 | 1/1967 | Maynard et al. | 260/17.4 |

OTHER PUBLICATIONS

Chem. Absts. vol. 75:6927c, "Adhesives Compositions Based on Poly(vinyl acetate) emulsions," Speed.

*Primary Examiner*—Edward M. Woodberry
*Attorney, Agent, or Firm*—Samuel Kurlandsky; Donnie Rudd; Robert H. Robinson

[57] ABSTRACT

A drying type crack-resistant joint compound comprising terra alba and a binder, the compound being characterized in that it is essentially free of mica.

5 Claims, 1 Drawing Figure

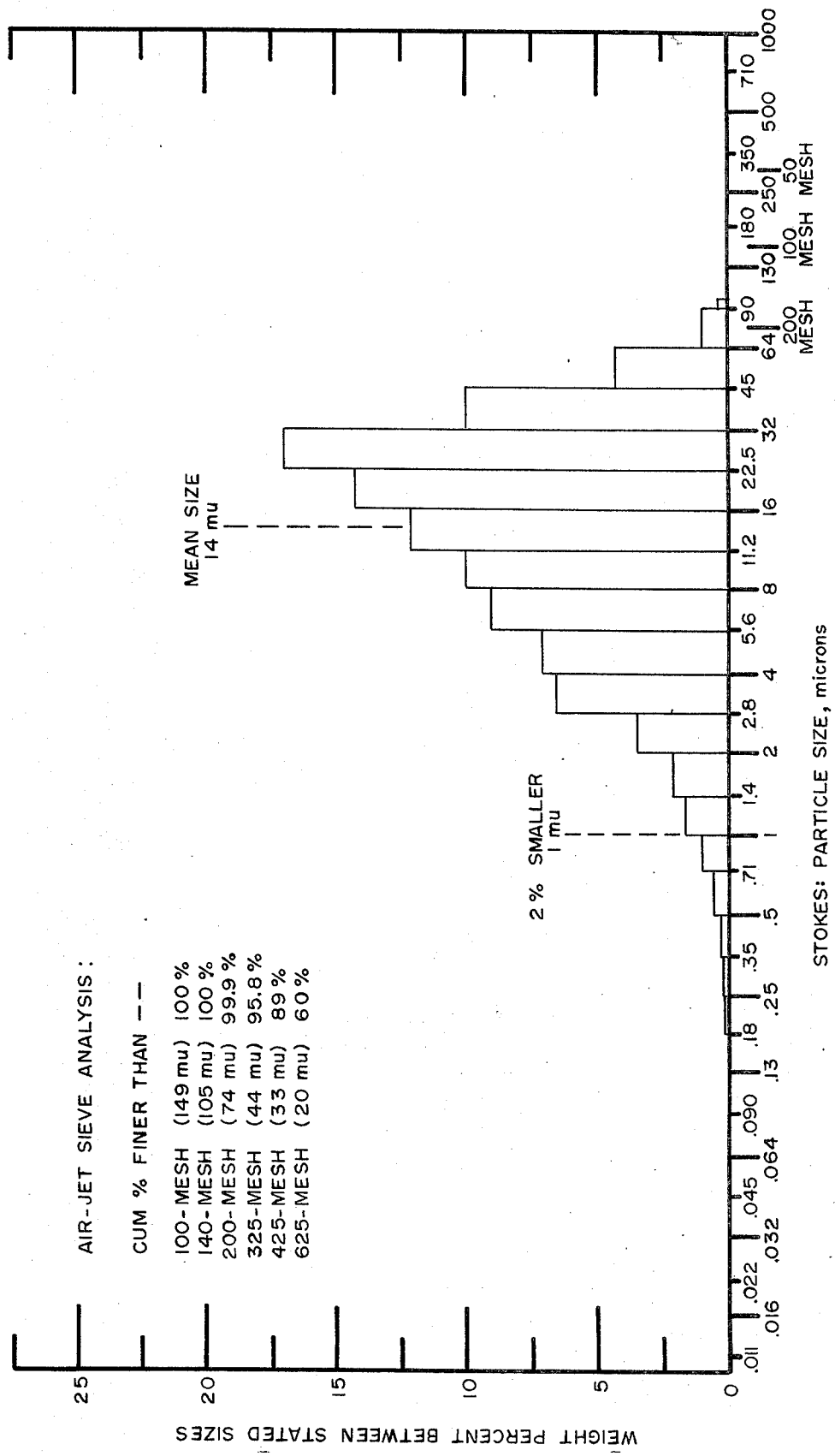

MICA, FREE, CRACK-RESISTANT DRYING TYPE JOINT COMPOUND

This is a continuation of application Ser. No. 277,446, filed Aug. 2, 1972, non-abandoned.

BACKGROUND OF THE INVENTION

In the construction of buildings with so-called dry walls, it is conventional to apply a joint compound to the joints of wallboard panels to conceal the joints and present a monolithic surface. It has also been conventional to use either a setting type of compound or a drying type of compound, or both, depending upon construction conditions, such as the rate at which the joint must be ready for further treatment or handling, atmospheric moisture conditions, and others. Settings types of compounds are characterized by a material, such as calcium sulfate hemihydrate, which reacts with some of the water in the compound to convert the hemihydrate into the dihydrate. Drying is incidental and in some cases undesirable. An example of a setting type of compound is disclosed in U.S. Pat. No. 3,297,601. On the other hand, drying type compounds do not react with the water, but rely on the evaporation of the water to give them strength. That is, instead of having a hemihydrate filler, calcium carbonate is often used. Such drying types usually incorporate a binder such as polyvinyl acetate, which when dry contributes the primary strength against stress needed by the compound. An example of a drying type is disclosed in U.S. Pat. No. 3,342,761.

Particularly in drying type joint compounds, it has been required heretofore that mica be incorporated to prevent cracking due to shrinkage. For example, United States Gypsum Company sells a Ready-Mix All-Purpose Joint Compound at its New Brighton, New York City plant which uses as a filler terrra alba, that is, landplaster which has been sized to remove plus 100 mesh particles. Mica is incorporated in the formulation of that compound. Even with a slowly setting type of compound produced by Keene's cement, mica has been recited to be an essential ingredient, as otherwise the dried product exhibits unacceptable cracking. See, e.g., U.S. Pat. No. 2,662,024. As a component which must be added, mica represents an additional cost which would be advantageously omitted, if possible. Further, it tends to increase the consistency of the final mix, thus requiring an increase in the amount of water that is required.

SUMMARY OF THE INVENTION

The invention relates to the discovery that certain terra alba when used as the filler for a drying type joint compound prevents cracking without the need for incorporating mica. More specifically, there is provided a crack-resistant, drying type joint compound adapted for use in finishing joints between wallboards when mixed with water, comprising a mixture of terra alba in an amount from about 80% to about 95% by weight, and a binder, the terra alba having a size distribution sufficient to prevent cracking without the addition of mica, the joint compound being characterized in that it is essentially free of mica. Apparently, the crack resistance is obtained by increasing the coarseness of the terra alba so that the mean particle size is at least about 14 microns, and the weight percent of particles smaller than 1 micron does not exceed about 2%.

Accordingly, it is an object of the invention to provide a crack-resistant, drying type joint compound wherein the need for mica has been eliminated.

It is a related object of the invention to provide such a compound wherein a terra alba filler itself provides the needed crack resistance.

It is a further object of the invention to provide such a compound wherein the number of ingredients, and the resultant cost of the compound, are minimized.

Still another object of the invention is to provide such a joint compound wherein the consistency of the paste form is low, so that water requirements are kept to a minimum.

Other objects and advantages will become apparent upon reference to the following brief description of the drawing and detailed discussion.

BRIEF DESCRIPTION OF THE DRAWING

The FIGURE illustrates the logarithmic particle size distribution histogram of terra alba found to be particularly suitable for the invention.

DISCUSSION OF THE PREFERRED EMBODIMENTS

The disclosure relates to a crack-resistant, drying type joint compound which is essentially free of mica. More specifically, it has been discovered that certain forms of terra alba fillers themselves have crack resistance which obviate the need for including mica as a crack inhibitor. When added to a binder, and certain optional additives, excluding however mica, the result is a joint compound which may be ready-mixed with water to a paste-like consistency, or packaged or stored in powder form.

The terra alba filler differs from that previously used with mica primarily in that it has a particle size distribution wherein the mean particle size is at least about 14 microns, and wherein the weight percent of particles smaller than 1 micron does not exceed about 2%. These small particles are undesirable due to their surface active characteristics. With these limits, the weight percent of the terra alba in the compound can be varied from about 80% to about 95%.

The amount of binder required can be varied from about 2% by weight to about 10% by weight, measured on a dry solids basis. Any suitable binder can be used as that ingredient is not critical. Examples include, but are not limited to, polyvinyl acetate alone, and modified starch in combination with either polyvinyl acetate or polyvinyl alcohol.

In addition to the foregoing, certain conventional additives may be optionally added for improved workability. These include asbestos, up to about 5% by weight, and preservatives and thickeners each of which is less than 1% by weight.

The following are specific examples set forth as illustrations only, for further explanation of the invention.

READY-MIXED COMPOUNDS

Landplaster obtained from the United States Gypsum plant at Southard, Oklahoma, was roller milled a minimum amount to decrease the amount of particles smaller than 1 micron. Thereafter, it was screened at 30 mesh to eliminate large particles and to enrich the feed to the size classifier. The fines from the screening were size-classified by a Raymond whizzer-type air classifier to remove plus 149 micron grit, thus converting it into terra alba having an increased mean particle size. As used in this specification, "terra alba" is understood to mean landplaster which is 100% finer than 149 microns. Some partial calcination occurred in the very small particles, which appears to cause undesired stiffening in the joint compound, and to avoid this, the air-classified terra alba was aerated either in transit or in storage, atmospheric moisture being sufficient to rehydrate such very small particles. This last step can be eliminated when using other types of air classifiers.

After preparation in the above fashion, the terra alba was found to have the particle size distribution illustrated in the histogram of the drawing. It is estimated that the only critical aspects of this histogram concern the mean particle size, and the weight percent smaller than 1 micron. It is believed that the remaining portions of the particle size distribution can be modified or altered without significantly affecting the crack-resistance of the compound made therefrom. This terra alba was then incorporated with other ingredients per the following formula to make a ready mixed joint compound.

Formula No. 1

| Ingredient | Weight Percent, Non-Volatile |
|---|---|
| Terra Alba | 93.2 |
| Polyvinyl Acetate Emulsion | 3.0 |
| Asbestos Shorts | 3.0 |
| Cellulosic Thickener | 0.8 |
| Preservatives | Less than 1 |
| Liquid Defoamer | Less than 1 |

In the above ingredients, the polyvinyl acetate emulsion was "Ucar 131" prepared by Union Carbide Corporation, an emulsion internally plasticized with 10% dibutyl phthalate and having 60% solids, a pH of 4 to 5, a weight of 9.2 pounds per gallon, a viscosity of 94 to 100 K.U., and a fineness of 100 particles maximum per 100 grams retained on a U.S. Standard 60 mesh sieve. For the remaining ingredients, a suitable cellulosic thickener which may be used is hydroxypropyl methyl cellulose, and the preservatives may be a mercurial preservative in combination with an organic non-metallic cyclic ether. Because the asbestos shorts, thickener, preservative, and defoamer are well known additives, for which a variety of brands are available, further description is unnecessary.

When water was added, the joint compound had a consistency of about 47 cc. per 100 grams for a viscosity of 630 Brabender, as measured by a VC-3 Brabender at 77° F., a commercially available viscometer equipped with a 250 centimeter-gram torsion head and operated at a 75 – 78 r.p.m. spindle speed.

Formula No. 1 produces a joint compound found to be essentially free of cracking when dried and which can be used as a topping compound. An all-purpose compound to finish wallboard joints, patch nail holes, repair damaged board, and give textured surfaces, all by conventional methods of applications, can be made by this formula by increasing the amounts of binder up to about 5%. Increasing the binder amounts to between about 7% and 10% provides a joint compound particularly suitable as an embedding compound. In each case, essentially no cracking occurs upon drying.

In contrast, a calcium carbonate filler having a similar histogram to that shown for the terra alba, and having a mean particle size of 14 microns, was incorporated into a formula similar to Formula No. 1, and upon drying resulted in unacceptable cracking due to the absence of mica.

DRY PACKAGED COMPOUNDS

One example of the invention packaged and stored as a dry joint compound to which water is added at the job site is Formula No. 2 below.

Formula No. 2

| Ingredient | Weight Percent |
|---|---|
| Terra Alba | 89.65 |
| Modified Starch Binder | 3.0 |
| Polyvinyl Alcohol Binder | 0.5 |
| Asbestos Shorts | 4.5 |
| Hydroxypropyl Methyl Cellulose | 0.5 |
| Titanium Dioxide Pigment | 1.0 |
| Preservatives | Less than 1 |
| Other Additives | Less than 1 |

The terra alba can be the type used in Formula No. 1, having a similar histogram. The modified starch binder is not believed to be critical, a suitable one being "Staramic 620" made by A. E. Staley Manufacturing Company and having 12.0% maximum moisture content, 85% minimum water solubility (on a dry solids basis), 20 ppm maximum foreign matter, a screen analysis of 0.5% plus U.S. Standard 60 mesh, a viscosity of 410 cps measured on a 20% dry solids basis, and a 12 Gardner color. Similarly, any polyvinyl alcohol may be used, a suitable example being "Gelvatol 20/60 BP" manufactured by Monsanto Chemical Co., and having a dry powder form of which 100% is minus U.S. Standard 50 mesh, 99.7% minus 60 mesh, a 4% aqueous solution at 20° C. having a Brookfield viscosity of 20 ± 5 cps and a pH of 6 to 8. As to the preservatives, these are conventional, and may be selected from those such as zinc dimethyldithiocarbamate. The other additives, which are optional, include dispersing agents and insolubilizing agents such as glyoxal. As they are conventional and well known, no further discussion of these other additives is necessary.

Formula No. 2 when mixed with water and conventionally applied, will produce a crack-free finish substantially similar in appearance to that produced by Formula No. 1.

Yet another embodiment which can be produced in accordance with the invention is a dry packaged joint compound similar to Formula No. 2, except that a spray-dried polyvinyl acetate binder is substituted for the polyvinyl alcohol. The amount of this binder must be increased so as to be present in an amount of at least 1%, bringing the combined starch and dry polyvinyl acetate binders up to at least 4%. As in the case of Formula No. 1, the particular polyvinyl acetate used is not believed to be critical, "Ucar 130" being a suitable example. Ucar 130 is the same as "Ucar 131", except the plasticizer is not incorporated into the polyvinyl acetate.

Although the invention has been described in connection with certain preferred embodiments, it is not intended that it be limited thereto. Rather, it is intended that it cover all alternate compositions, equivalents, and embodiments as may be covered by the scope of the following claims.

What is claimed is:

1. A crack-resistant, drying type joint compound adapted for use in finishing joints between wallboards when mixed with water, comprising a mixture of terra alba in an amount from about 80% to about 95% of the weight of the total composition, a thickener, and a binder, in an amount from about 2% to about 10% of the weight of the total composition, said terra alba being characterized by a size distribution sufficient to prevent cracking without the addition of mica, whereby said joint compound is essentially free of mica.

2. The joint compound as defined in claim 1, wherein said terra alba has a size distribution characterized in that the mean-particle size is at least about 14 microns and the weight percent of particles smaller than 1 micron does not exceed about 2% of the weight of the terra alba.

3. The joint compound as defined in claim 1, wherein said binder is polyvinyl acetate.

4. The joint compound as defined in claim 1, wherein said binder is starch mixed with a polymer selected from the group consisting of polyvinyl acetate and polyvinyl alcohol.

5. A ready-mixed joint compound comprising the joint compound as defined in claim 1, and enough water to give it a paste-like consistency.

* * * * *